(12) United States Patent
Jeyaseelan

(10) Patent No.: US 9,176,570 B2
(45) Date of Patent: Nov. 3, 2015

(54) SYSTEM AND METHOD FOR PROVIDING UNIVERSAL SERIAL BUS LINK POWER MANAGEMENT POLICIES IN A PROCESSOR ENVIRONMENT

(71) Applicant: Intel Corporation, Santa Clara, CA (US)

(72) Inventor: Jaya L. Jeyaseelan, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 376 days.

(21) Appl. No.: 13/730,967

(22) Filed: Dec. 29, 2012

(65) Prior Publication Data

US 2014/0189409 A1 Jul. 3, 2014

(51) Int. Cl.
*G06F 1/00* (2006.01)
*G06F 1/32* (2006.01)

(52) U.S. Cl.
CPC ........... *G06F 1/3253* (2013.01); *Y02B 60/1235* (2013.01)

(58) Field of Classification Search
CPC .............. G06F 1/3253; G06F 13/4068; Y02B 60/1235
USPC ......................................... 713/300, 320, 330
See application file for complete search history.

(56) References Cited

U.S. PATENT DOCUMENTS

| | | | |
|---|---|---|---|
| 6,347,294 B1 * | 2/2002 | Booker et al. | 703/28 |
| 7,827,455 B1 * | 11/2010 | Eckel et al. | 714/735 |
| 7,844,266 B2 | 11/2010 | Jeyaseelan et al. | |
| 7,844,760 B2 | 11/2010 | Jeyaseelan et al. | |
| 7,864,720 B2 | 1/2011 | Jeyaseelan | |
| 7,984,314 B2 | 7/2011 | Cooper et al. | |
| 8,176,341 B2 | 5/2012 | Jeyaseelan et al. | |
| 8,190,152 B2 | 5/2012 | Jeyaseelan et al. | |
| 8,255,713 B2 | 8/2012 | Jeyaseelan et al. | |

FOREIGN PATENT DOCUMENTS

| | | |
|---|---|---|
| CN | 1853429 A | 10/2006 |
| CN | 101420720 A | 4/2009 |
| CN | 101615067 A | 12/2009 |
| EP | 1678970 B1 | 8/2008 |
| GB | 2458805 B | 10/2010 |
| KR | 10-1087429 B1 | 11/2011 |
| KR | 10-1158204 B1 | 6/2012 |
| KR | 10-1162156 B1 | 6/2012 |

* cited by examiner

*Primary Examiner* — Mark Connolly
(74) *Attorney, Agent, or Firm* — Patent Capital Group

(57) ABSTRACT

One particular example implementation may include an apparatus that includes logic, at least a portion of which is in hardware, the logic configured to: determine that a first device maintains a link to a platform in a selective suspend state; assign a first latency value to the first device; identify at least one user detectable artifact when a second device exits the selective suspend state; and assign, to the second device, a second latency value that is different from the first value.

30 Claims, 7 Drawing Sheets

SYSTEM AND METHOD FOR PROVIDING UNIVERSAL SERIAL BUS LINK POWER MANAGEMENT POLICIES IN A PROCESSOR ENVIRONMENT

TECHNICAL FIELD

Embodiments described herein generally relate to providing for power savings in a processor environment.

BACKGROUND

As electronic devices become more complex and ubiquitous in the everyday lives of users, more and more diverse requirements are placed upon them. For example, many electronic devices can operate on battery power, thus allowing users to operate these devices in many different circumstances. In addition, as capabilities of electronic devices become more extensive, many users may become reliant on the enhanced performance such capabilities provide. As these aspects of electronic devices have evolved, there has become an increasing need for power optimization so that users may enjoy longer battery life. However, under many circumstances, power optimization may sacrifice performance. Therefore, it will be highly beneficial for a user to be able to have the desired performance when it matters the most to them, and to have power optimization during circumstances (e.g., idle and semi-idle scenarios) where performance may be less important to them.

BRIEF DESCRIPTION OF THE DRAWINGS

Embodiments are illustrated by way of example and not by way of limitation in the FIGURES of the accompanying drawings, in which like references indicate similar elements and in which.

The FIGURES of the drawings are not necessarily drawn to scale or proportion, as their dimensions, arrangements, and specifications can be varied considerably without departing from the scope of the present disclosure.

DETAILED DESCRIPTION OF EXAMPLE EMBODIMENTS

The following detailed description sets forth example embodiments of apparatuses, methods, and systems relating to providing a power savings in a processor environment. Features such as structure(s), function(s), and/or characteristic(s), for example, are described with reference to one embodiment as a matter of convenience; various embodiments may be implemented with any suitable one or more of the described features.

Figure 1:
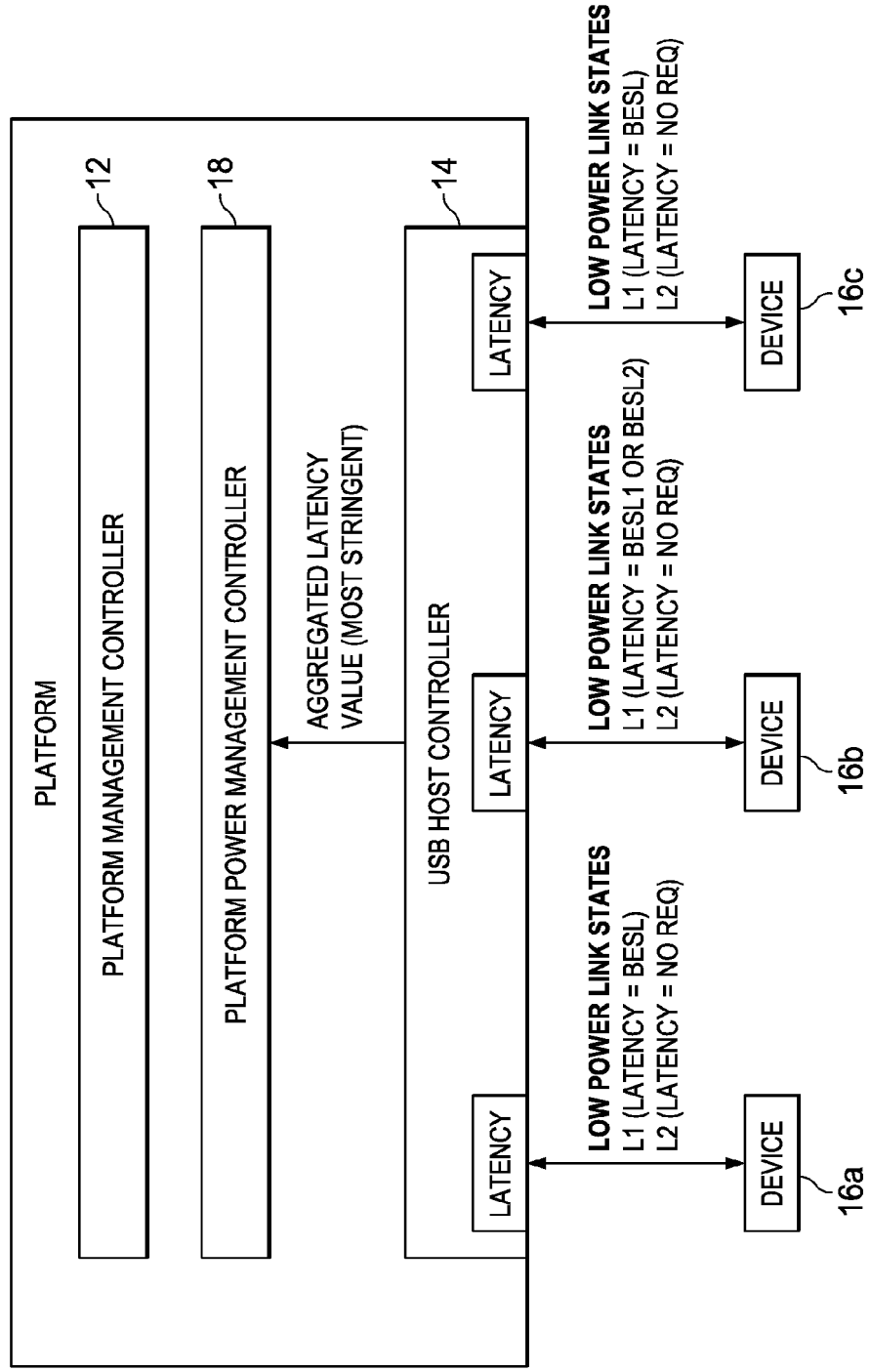
FIG. 1 is a simplified block diagram illustrating an embodiment of an electronic device, in accordance with one embodiment of the present disclosure.

FIG. 1 is a block diagram illustrating component interaction of an platform 10 according to at least one example embodiment. The examples of FIG. 1 are merely examples of component interaction, and do not limit the scope of the claims. For example, operations attributed to a component may vary, number of components may vary, composition of a component may vary, and/or the like. For example, in some example embodiments, operations attributable to one component of the example of FIG. 1 may be allocated to one or more other components.

FIG. 1 is a block diagram of a platform 10 in accordance with various embodiments. On a general level, the concepts presented herein (in certain example embodiments) address device implementation and which policies the device chooses. In various embodiments, platform 10 may be used in a computing device, which may be, for example, a laptop, a cell phone, a personal computer, a personal digital assistant, a palmtop, a set-top box, or any other appropriate type of computing device. In various embodiments, platform 10 may be used in a mobile computing device.

In at least one example embodiment, platform 10 may include a platform management controller 12, a universal serial bus (USB) host controller 14, a plurality of devices 16a-c, and a platform power management controller 18. More generally, platform 10 may include any suitable USB system and device driver stack. Devices 16a-c are connected to USB host controller 14 through a USB port. Devices 16a-c are compatible with various versions of the USB standard (e.g., USB 2.0 (USB2), 3.0, etc.). The USB 2.0 Specification was released in April 2000. Additionally, the present disclosure may be applicable to any other version of the USB Specification. In various embodiments, the components of platform 10 may also include one or more controllers configured to control one or more devices/functions in the computing device, including but not limited to, a memory controller, an Ethernet controller, a graphics controller, a hard disk controller (HDD), an audio controller, Advanced Host Controller Interface (AHCI), etc. In various embodiments, the components of platform 10 may also include one or more software applications running on the computing device, one or more device drivers, an operating system, etc. Platform management controller 12 may be a chip, a host CPU, an expansion card, a stand-alone device that interfaces with a peripheral device, a plug in board, a single integrated circuit on the motherboard, an external device, etc.

Current platforms exhibit enough activity from multiple sources that would preclude the platform from doing efficient power management. If devices were able to coalesce activity by intelligent buffering and deferring non-critical events, and align activity to other platform events such that all activity occurs in bursts with long periods of idleness in between, the platform would be able to use deeper power management states during these idle periods.

The USB2 Specification relates to a polled bus. When the device has no data to move, the device will continue to be polled if there are transactions pending at the host controller. The USB 2.0 suspend state can save power on the USB link, but it is difficult to use dynamically due to limitations. For example, it takes considerable time to enter and exit the suspend state (three (3) milliseconds (ms)+Operating System (OS) overhead for entry and thirty (30) ms+OS overhead for exit), and devices are restricted on how much power they can consume in this state. A Link Power Management (LPM) L1 state, is a state that attempts to address the deficiencies of the suspend state. An LPM L1 ECN to the USB2 Specification was introduced in 2007.

LPM formally defines four power management states for USB devices, L0 (on), L1 (sleep with a finer granularity than L2), L2 (suspend), and L3 (off). The L1 sleep state differs from the L2 suspend state in that in the L1 state, the transitional latencies are much shorter than the L2 state and there are no explicit power draw requirements in the LPM L1 state. The low-latency LPM L1 state is intended to be used dynamically when a device is operational (e.g., in an Advanced Configuration and Power Interface (ACM) D0 state, described below), but otherwise idle and able to quickly enter and exit this low power state without disrupting normal operation. It is backward compatible in that a new host can determine whether a device supports a LPM L1 state and can only be used if the device acknowledges support for this feature.

Note that the present disclosure can be applicable to ACPI™ Revision 5.0, released in November 2011. Additionally, the present disclosure is applicable to any other version of the ACPI™ Specification. Device power states, for example under the ACPI standard, may be referred to as D-level states. Power state D0 is associated with the device being fully on and in an operating state. Power state D0 may be associated with an absence of power or thermal savings, and may be referred to as an operation mode.

Power states D1 and D2 may be associated with intermediate power-states whose definition varies by device. Device power state D1 is the highest-powered device low-power state. The power consumption in a D1 state is less than in the D0 state but greater than or equal to that in the D2 state. Frequently, D1 is a clock-gated state in which the device receives just enough power to preserve the device's hardware context. Typically, the specification for a bus or device class that supports D1 describes this state in more detail. Regarding the device context, generally the device context is preserved by the hardware and need not be restored by the driver. The specification for a bus or device class that supports D1 typically provides detailed requirements for preserving this context. The device driver behavior should save and restore or reinitialize any context lost by the hardware. Typically, however, devices lose little context upon entering this state. The restore time (the time required to restore the device to D0 from D1) should be less than restoration from D2 to D0. Typically, devices that use D1 do so because resuming from this state does not require the driver to restore the device's full hardware context.

Power state D2 is an intermediate device low-power state where power consumption is less than or equal to that in the D1 state. In general, most device context is lost by the hardware when in a D2 state. Frequently, the state preserves the part of the context that is used to signal wake events. The specification for a bus or device class that supports D2 typically provides detailed requirements for preserving this context. A typical device loses most context when it enters D2 and therefore, device drivers should save and restore or reinitialize any context lost by the hardware. The restore time from D2 to D0 takes at least as long as restoring the device from D1 to D0. Typically, drivers that support D2 do so because their devices cannot support a wake from D3. For these devices, power consumption in the D2 state drops to the lowest level from which the device can recover in response to a wake signal. In contrast to the D1 state, which is implemented to reduce the delay perceived by the user, the goal in implementing the D2 state is to conserve power. As a result, the restore time from D2 to D0 typically exceeds that from D1 to D0. In the D2 state, for example, reduced power on the bus might cause a device to turn off some of its functionality, thus requiring additional time to restart and restore the device. Many classes of device do not define a D2 state.

Power State D3 has the device powered off and unresponsive to its bus. The D3 state may be referred to as a sleep state. The D3 state can be further divided into two sub-states, D3-hot and D3-cold. When a device is in a D3-hot state, the device has auxiliary power. When the device is in a D3-cold state, the device does not have any (or very little) power provided. A device in D3-hot can assert power management requests to transition to higher power states. It should be understood that device power states may be further divided into sub-states that vary in power savings and recovery latency.

Programs may communicate regarding power states by using information indicating power state information. For example, there may be a variable, a message parameter, and/or the like that comprises information that indicates a power state. In addition, there may be a variable, a message paramter, and/or the like, that comprises information indicating a power state limitation. A power state limitation may be a limitation that restricts a power state that a device is allowed to enter. For example, a power state limitation may be a limitation that the power state should be no greater than D2, thus precluding power state D3. In at least one example embodiment, the power state limitation may apply to the ACPI standard. In such an embodiment, the power state limitation may constrain D-level settings.

Even though sleep power states described herein relate to the ACPI Specification, it should be understood that the ACPI is merely an example of a power management scheme that may be utilized to manage power in a processor or a system. Therefore, direct references to specific elements of the ACPI do not limit the claims, unless such specific elements are expressly incorporated into the claims.

System power states, under the ACPI standard, may be referred to as S-level states. Power state S0 (or G0) is associated with normal operation of the system. Power state S0 may be associated with absence of power or thermal savings. Power state S0 may be referred to as a working mode. Power States S1-S4 relate to various depths of sleep-based power saving. Power state S1 may be associated with a power saving state for which instruction execution may restart with the lowest recovery latency of the S1-S4 states, but with the lowest power saving of the S1-S4 states. Power state S1 may involve flushing processor caches, terminating processor execution, retaining power to RAM and the processor, and reducing power to devices in the system that fail to indicate a need to avoid reduced power. Power state S1 may be referred to as a stop-processing mode. Power state S2 may be associated with a power saving state for which instruction execution may restart with a longer recovery latency than the S1 state, but with the greater power saving than the S1 state. Beyond the power saving actions of S1, power state S2 may involve powering off the processor and flushing the dirty cache to RAM. Power state S2 may be referred to as a processing-off mode.

Power state S3 may be associated with a power saving state for which instruction execution may restart with a longer recovery latency than the S2 state, but with the greater power saving than the S2 state. Beyond the power saving actions of S2, power state S3 may involve powering off all components except a real time clock and memory, which may operate at a reduced power level. Power state S3 may be referred to as a standby mode. Power state S4 may be associated with a power saving state for which instruction execution may restart with a longer recovery latency than the S3 state, but with the greater power saving than the S3 state. Beyond the power saving actions of S3, power state S4 may involve storing volatile memory contents to non-volatile memory and terminating power to memory. Power state S4 may be referred to as a hibernation mode. Power state S5 may be associated with a power saving state that avoids saving system context information. Power state S5 may be terminated by pressing a power button. Power state S5 may be referred to as a soft-off mode.

Programs may communicate regarding system power state by using information indicating power state information. For example, there may be a variable, a message parameter, and/or the like that comprises information that indicates a power state. In addition, there may be a variable, a message parameter, and/or the like, that comprises information indicating a power state limitation. A power state limitation may be a limitation that restricts a power state that the system is allowed to enter. For example, a power state limitation may be a limitation that the power state should be no greater than S2, thus precluding power states S3, S4, and S5. In at least one example embodiment, the power state limitation may apply to the ACPI standard. In such an embodiment, the power state limitation may constrain S-level settings.

In current platforms, the only low power LPM state supported by USB2 devices is selective suspend. This feature allows a USB device driver (that supports selective suspend) to put the link (of the USB device it controls) into selective suspend when the device is idle. When the device is no longer idle and is to be used again, the system wakes the device and resumes normal operation. The USB Specification also defines an additional low power feature call remote wakeup. This feature, if supported by the USB device, allows the USB device to wake itself from selective suspend. This allows a device specific event to resume the system instead of the system resuming the device.

However, the exit latency from a selective suspend is fairly large and, further, many devices in categories like communication devices, human interface devices (HIDs), etc., do not have high selective suspend residency. Power is expended both by the device and by other platform components (e.g., like the host controller when the USB link is kept in link power management (LPM) L0 state). Putting the link in to a low-power LPM L1 state allows power savings on both sides of the link.

The LPM L1 state implicitly conveys this to the platform whether the device is idle. Link states (such as SATA Partial and Slumber states, USB2 LPM L1 and suspend states) can be translated into latency requirements by host controller 14 and sent to platform power management controller 18. Platform power management controller 18 can use these latency requirements to determine how deeply to power manage various platform components without undermining the performance of the device, quality of service requirements, etc.

An LPM L1 ECN in the USB2 specification (introduced in 2007) defines a parameter called Best Effort Service Latency (BESL), which can be used by the host controller to provide latency requirements. The value of BESL indicates the best effort to resumption of service to the device after the initiation of a resume event from LPM L1 state to L0. It can reflect the point in time after a resume start to the start of transactions to a device endpoint. The time is not a guarantee, but a best effort that will be made by the host to service the device by that time. A larger BESL value translates to larger latency requirements sent by host controller 14 to platform power management controller 18, and allows deeper power savings on both the host and the device side, as components on both sides have more time to exit from the deeper low power states. However, choosing a fixed BESL value (which may be the simplest implementation) is not the most optimal for platform power consumption.

An LPM L1 implementation and BESL selection in a device can be done in many ways based on device requirements. For instance, a communication device like a WWAN or WLAN device moves much more data to (or from) a host platform and, further, it is more sensitive to latency due to buffering constraints compared to a HID. Some other devices (like digital cameras) keep their links in selective suspend when not in use and, further, would utilize LPM L1 only when active for periods of inactivity between bursts of data movement. They are not sensitive to the selective suspend exit latency when transitioning from idle to active.

The USB2.0 LPM L1 ECN errata (September 2011) enables a USB2.0 device to communicate (to the host) its preferred BESL and BESLD values in the USB2.0 extension descriptor. Device implementations may select a subset of specific design points for optimization within the full range. The recommended use of these fields is that the baseline BESL field can have a value less than the deep BESL field. The expected use is the baseline BESL value communicates a nominal power savings design point and the deep BESL value communicates a significant power savings design point.

In one example, the USB device driver may know that the device is a digital camera and can send a message to USB host controller 14 to keep the link to the device in a selective suspend state when the device is not in use, and in a LPM L0 state when the device is in use. In the idle period between bursts of activity, USB host controller 14 can attempt to put the link into a low power LPM L1 state with a BESL of about four hundred (400) us (or whatever optimal BESL value was indicated by the device). The BESL time accounts for the duration before data transfer from device can be resumed, and is used to set the appropriate buffer watermark thresholds so that there are no buffer overruns.

In another example, the USB device driver may know that the device is a network data device, where the exit latency from selective suspend may cause buffer overruns or underruns, and/or an associated loss of performance. In this example, the USB device driver may not direct USB host controller 14 to keep the link to the device in a selective suspend state when connected to the network even when the device is predominantly idle. Since in many usage models, platforms are always connected to the network, for optimal power savings the networking device should support two BESL values and indicate the two values to the host controller (e.g., via the USB2.0 extension descriptor). When link is idle, USB host controller 14 can attempt to put the link to the device into an LPM L1 state with a deep BESL value of about 5 msec and if the device returns a NYET response, then re-try the L1 entry with a BESL value of about 400 usec. The device can ACK the L1 entry with BESL value of about 400 usec between idle periods of data movement and ACK entry into an LPM L1 state with a BESL of about five (5) ms when the device is connected (but very idle).

In yet another example, the USB device driver may know that the device is a USB2.0 device, where the exit latency from selective suspend may cause user detectable artifacts, such as with a HID (e.g., a mouse or touch controller). In this example, USB host controller 14 cannot keep the link to the device in a selective suspend state when the device is idle. In a device like a USB2.0 mouse for example, the idle to active transition may show up as in jerky mouse movement on the screen due to large exit latencies from selective suspend. However, such an HID device can easily tolerate a latency of about 5 msec without any visible artifacts. For optimal power savings, an HID device can indicate that it supports a BESL value of around 5 msec to USB host controller 14 (e.g., via the USB2.0 extension descriptor). The USB host controller will transition the link to the device into an LPM L1 state with a BESL of about three (3) ms to about five (5) ms between periods of inactivity. By recognizing the latency requirements of each device and what devices are sensitive to, the selective suspend exit latency, a low power link state can be used for each device such that each device can enter and exit a low power state without disrupting normal operations.

Figure 2:
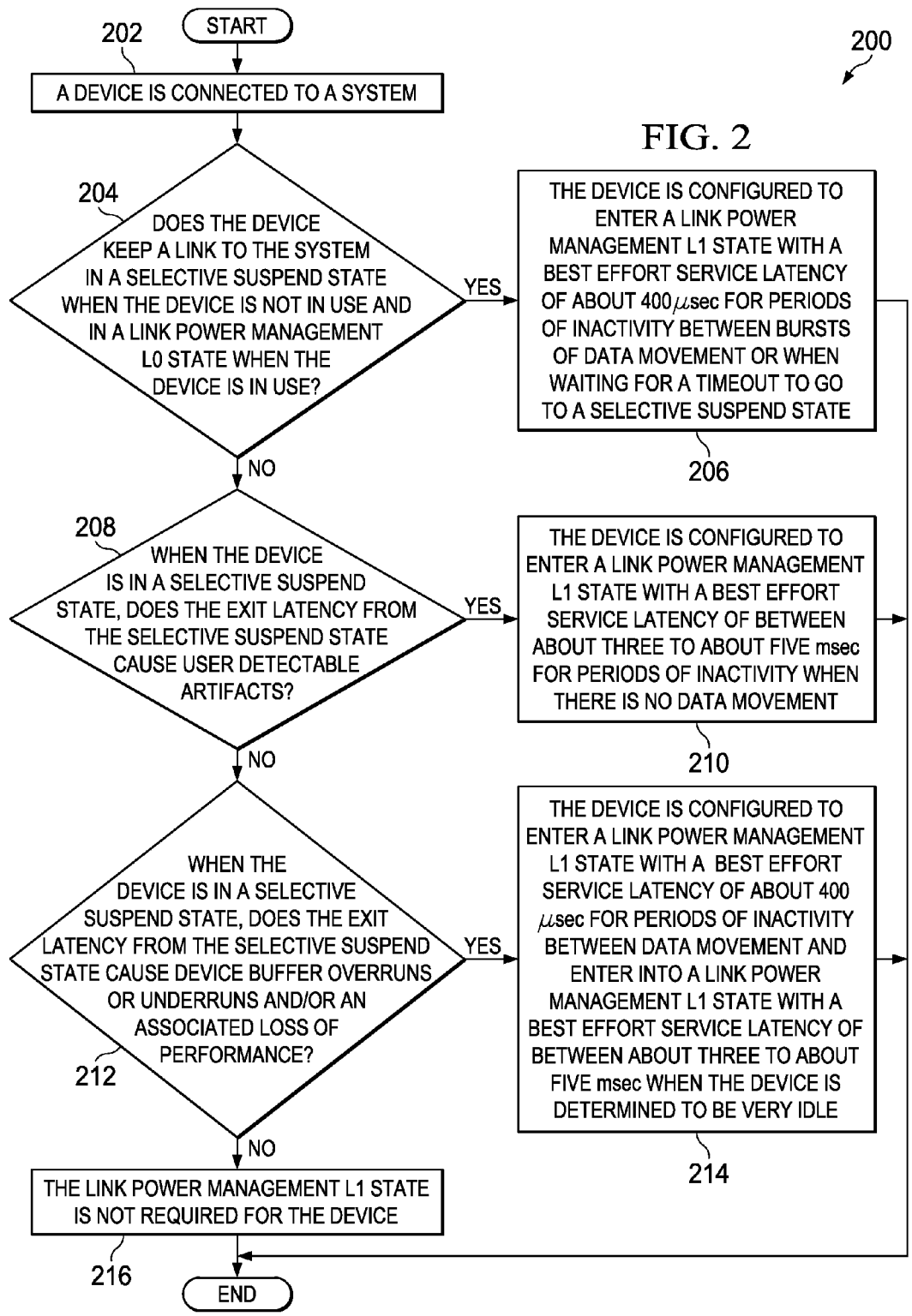
FIG. 2 illustrates, for one embodiment, an example flow diagram in accordance with one embodiment of the present disclosure.

Turning to FIG. 2, FIG. 2 is a simplified flowchart 200 illustrating one potential operation associated with the present disclosure. The flow generally indicates which LPM L1 policies a device should implement based on the device's latency requirements, amount of data movement, buffering constraints, frequency of data movement, selective suspend residency, etc. At 202, a device is connected to a system. At 204, the device determines if it can keep the link to the system in a selective suspend state when the device is not in use and in a link power management L0 state due to stringent latency requirements when the device is in use. If so, the device can support LPM state with a BESL of about 100 to four hundred (400) microseconds (us) for periods of inactivity between bursts of data movement or when waiting for a timeout to go to a selective suspend state, as in 206.

At 208, the device determines if it does not have stringent latency requirements when active as in 204, and if the exit latency from the selective suspend state causes user detectable artifacts precluding use of selective suspend when idle. If so, the device can support link power management L1 state with a BESL of between about three (3) to about five (5) milliseconds (ms) for periods of inactivity when there is no data movement, as in 210.

At 212, the device determines if the exit latency from the selective suspend state causes device buffer overruns, buffer underruns, and/or an associated loss of performance. Such a device (e.g., a networking device) is generally in use when connected to the network and cannot transition to the selective suspend due to buffering constraints and latency requirements. The device can enter an LPM L1 state with a BESL of about four hundred (400) us for periods of inactivity between data movement and enter into an LPM L1 state with a BESL of between about three (3) to about five (5) ms when the device is determined to be very idle, as in 214. If the device determines that it is rarely used and the link selective suspend residency is high, then the LPM L1 state is not required for the device, as in 216.

Figure 3:
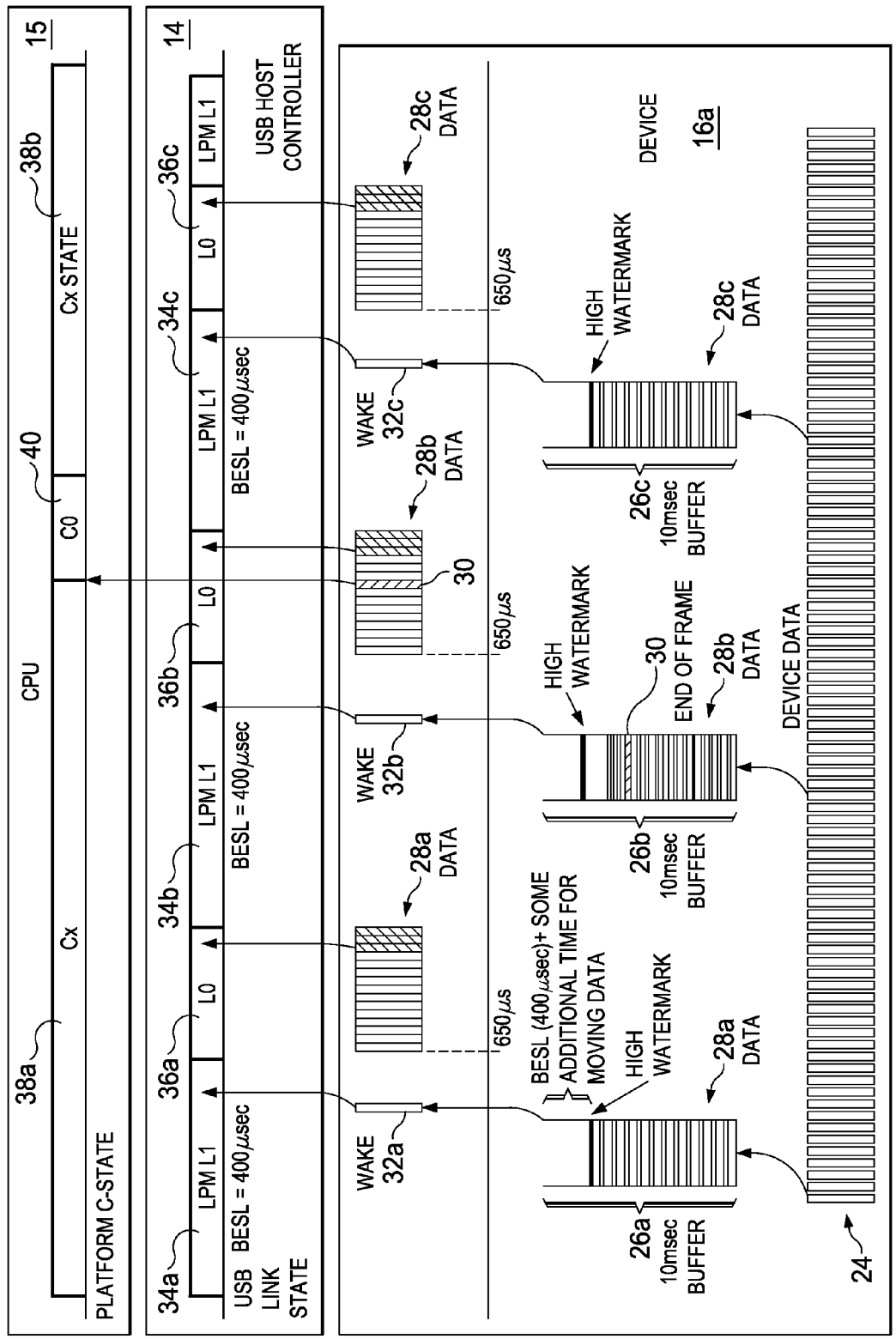
FIG. 3 is a simplified time diagram illustrating possible example details associated with the communication system.

Turning to FIG. 3, FIG. 3 is a simplified block diagram illustrating one possible set of details according to at least one example embodiment. The examples of FIG. 3 are merely examples of an electronic configuration, and do not limit the scope of the claims. For example, the number of electrical components may vary, the placement of the electrical components may vary, operations attributed to a software component may vary, number of software components may vary, composition of a software component may vary, and/or the like. This particular configuration includes device data 24.

Device data 24 and the illustrative examples are only used for illustrative purposes. Device data 24 may be any data that is collected or used by a device (e.g., device 16*a*) that keeps a link to a host controller (e.g., USB host controller 14) in a selective suspend state when not in use and in a LPM L0 state when the link is in use (e.g., digital camera, secure digital (SD) card reader, television tuner, etc.). Device 16*a* includes one or more buffers (buffers 26*a*-26*c* each may be the same buffer at a different point in time and are shown to illustrate the passage of time). As device data 24 is collected by device 16*a*, the data is placed into one or more buffers and each buffer has a known capacity (e.g., buffer 26*a* is shown to hold about 10 msec of data). A high watermark may be used such that when the amount of data in the buffer reaches a certain level, a wake signal (e.g., wake signal 32*a*) is sent to USB host controller 14.

The wake signal is sent in sufficient time to allow transition from a low power state to an active state so the data may be flushed from the buffer before any overruns occur. For example, before the wake signal is sent, USB host controller 14 may be in a LPM L1 state (e.g., LPM L1 state 34*a*). After receiving wake signal 32*a*, the USB link transitions into an active state (e.g., L0 state 36*a*) and data transfers are initiated by USB host controller 14 within BESL time indicated in the LPM L1 token. This guarantees predictable behavior and the devices can appropriately design the buffer watermarks to avoid buffer overruns. After the data (e.g., data 28*a*) has been received, USB host controller 14 can enter into another LPM L1 state (e.g., LPM L1 state 34*b*) for some period of inactivity. If device data 24 includes frames, an end of frame indicator 30 may be used to identify the end of a frame. When end of frame indicator 30 is detected, the platform processor core (CPU) may wake out of a low power state (e.g., Cx state 38*a* described below) and enter into an active state (e.g., C0 state 40) to execute code and receive the frame data. Once the frame data has been received, CPU 15 and platform processor may enter into another low power state (e.g., Cx state 38*b*).

The ACPI Specification defines the CPU C-states power management states. CPU operating states (C-states) are the capability of an idle processor to turn off unused components to save power. When a processor runs in the C0 state, it is working. A processor running in any other C-state is idle. Higher C-state numbers represent deeper CPU sleep states. At higher C-states, more components shut down to save power. Some components that are shut down include stopping the processor clock and stopping interrupts. A disadvantage is that deeper sleep states have larger wake up times.

Figure 4:
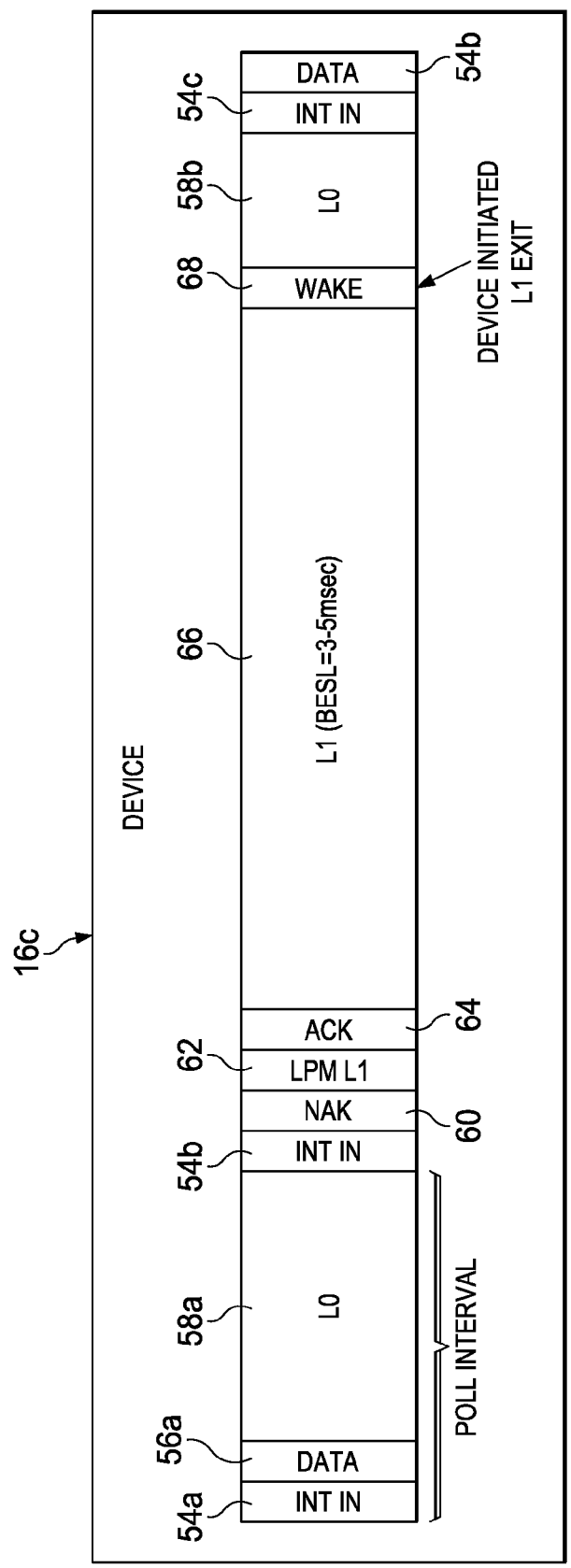
FIG. 4 is a is a simplified time diagram illustrating possible example details associated with the communication system.

Turning to FIG. 4, FIG. 4 is a simplified block diagram illustrating one possible set of details according to at least one example embodiment. The examples of FIG. 4 are merely examples of an electronic configuration, and do not limit the scope of the claims. For example, the number of electrical components may vary, the placement of the electrical components may vary, operations attributed to a software component may vary, number of software components may vary, composition of a software component may vary, and/or the like. This particular configuration includes device 16*c*. Device 16*c* is a USB2.0 human interface device (HID) where the exit latency from selective suspend may cause user detectable artifacts, such as with a mouse or touch controller.

HID devices typically use Interrupt Endpoints for data movement. At the poll interval, device 16*c* receives an IN Token 54*a* from the USB host controller 14 on its interrupt endpoint. If the device has data to send, it sends the data 56*a* to the USB host controller 14. In FIG. 4, the USB host controller keeps the link in L0 58*a* until the next poll 54*b*. In another embodiment, the host controller may put the link into LPM L1 and bring the link back to L0 just before the next poll 54*b*. Then the device 56*a* receives another IN Token 54*b* on its interrupt endpoint but this time instead of data sends a negative acknowledgement (NAK) signal 60 as it has no data to send. NAK signal 60 causes USB host controller 14 to send a low power LPM L1 Token request signal 62. In response to LPM L1 Token request signal 62, an ACK signal 64 is sent by the device 16*c* and the link enters into a lower power LPM L1 state 66. The link stays in the LPM L1 state until there is new data from device 16*c* that needs to be sent to the host e.g.

mouse click or movement. At such a time, the device 16*c* will initiate a L1 exit 68. The link will transition to L0 58*b* and the host controller will start polling the device again 54*c*. The poll will occur before poll interval duration or BESL, bound by the larger of the two. The device sends data to host controller 54*b*. In one example (not shown), device may receive a second NAK signal which would cause device 16*c* to enter into another low power state.

Figure 5:
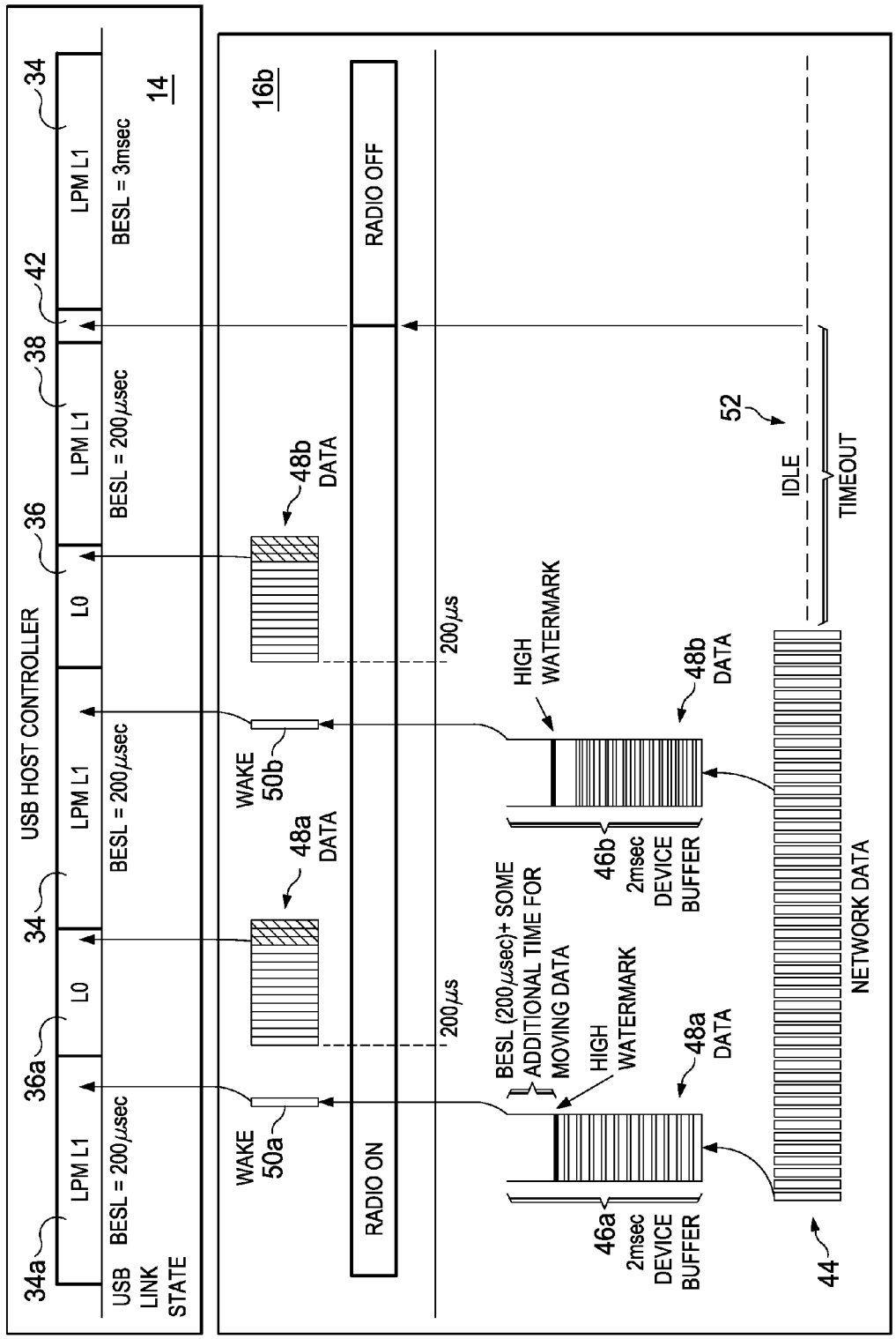
FIG. 5 is a simplified time diagram illustrating possible example details associated with the communication system.

Turning to FIG. 5, FIG. 5 is a simplified block diagram illustrating one possible set of details according to at least one example embodiment. The examples of FIG. 5 are merely examples of an electronic configuration, and do not limit the scope of the claims. For example, the number of electrical components may vary, the placement of the electrical components may vary, operations attributed to a software component may vary, number of software components may vary, composition of a software component may vary, and/or the like. This particular configuration includes device data 44.

Device data 44 and the illustrative examples are only used for illustrative purposes. Device data 44 may be any data that is collected or used by a device (e.g., device 16*b*) where the exit latency from selective suspend may cause buffer overruns or underruns and/or an associated loss of performance. An example of such a device would be a wireless networking device like a WLAN or WWAN device. Device 16*b* includes a buffer (buffers 46*a* and 46*c* each may be the same buffer at a different point in time and are shown to illustrate the passage of time). As device data 44 is collected by device 16*b*, the data is placed into one or more buffers and each buffer has a known capacity (e.g., buffer 26*a* is shown to hold about 2 ms of data). A high watermark may be used such that when the amount of data in the buffer reaches a certain level, a wake signal (e.g., wake signal 50*a*) is sent to USB host controller 14. The wake signal is sent in sufficient time to allow transition from a low power state to an active state so the data may be flushed from the buffer before any buffer overruns occur. In this particular example, before the wake signal was sent, USB host controller 14 may be in a LPM L1 state (e.g., LPM L1 state 34*a*). After receiving wake signal 50*a*, the link is transitioned into an active state (e.g., L0 state 36*a*) and data transfers are initiated by the USB host controller 14 within BESL time indicated in the LPM L1 token. After the data (e.g., data 48*a*) has been received, USB host controller 14 can enter into another LPM L1 state (LPM L1 state 34*b*) after a certain inactivity timeout.

For optimal power savings, such a networking device which is nearly always connected to the network would support two values of BESL; a smaller value for LPM L1 state during bursts of data transfers and a larger BESL value for LPM L1 state when predominantly idle.

In an embodiment, USB host controller 14 sends a first BESL value (e.g., three (3) ms). If device 16*b* is receiving data or is otherwise somewhat active where the radio is on in case of wireless devices and there are chances of data being received over the wireless network, the first BESL value can be rejected. Upon rejection (NYET) of the LPM L1 Token with first BESL value, a second LPM L1 token with lower BESL value can be sent (e.g., two hundred (200) us).

After some period of no network activity 44, the device 16*b* may use an idle timeout 52 to power off its radio. At this time, the device 16*b* initiates a LPM L1 Wake if link is in LPM L1 and the link is transitioned to L0 42. When the USB host controller 14 attempts the LPM L1 entry with BESL value of 3 msec, the device 16*b* may safely accept LPM L1 token and the link transitions to LPM L1 34. As the radio is off, there can be no risk of buffer overflows.

Figure 6:
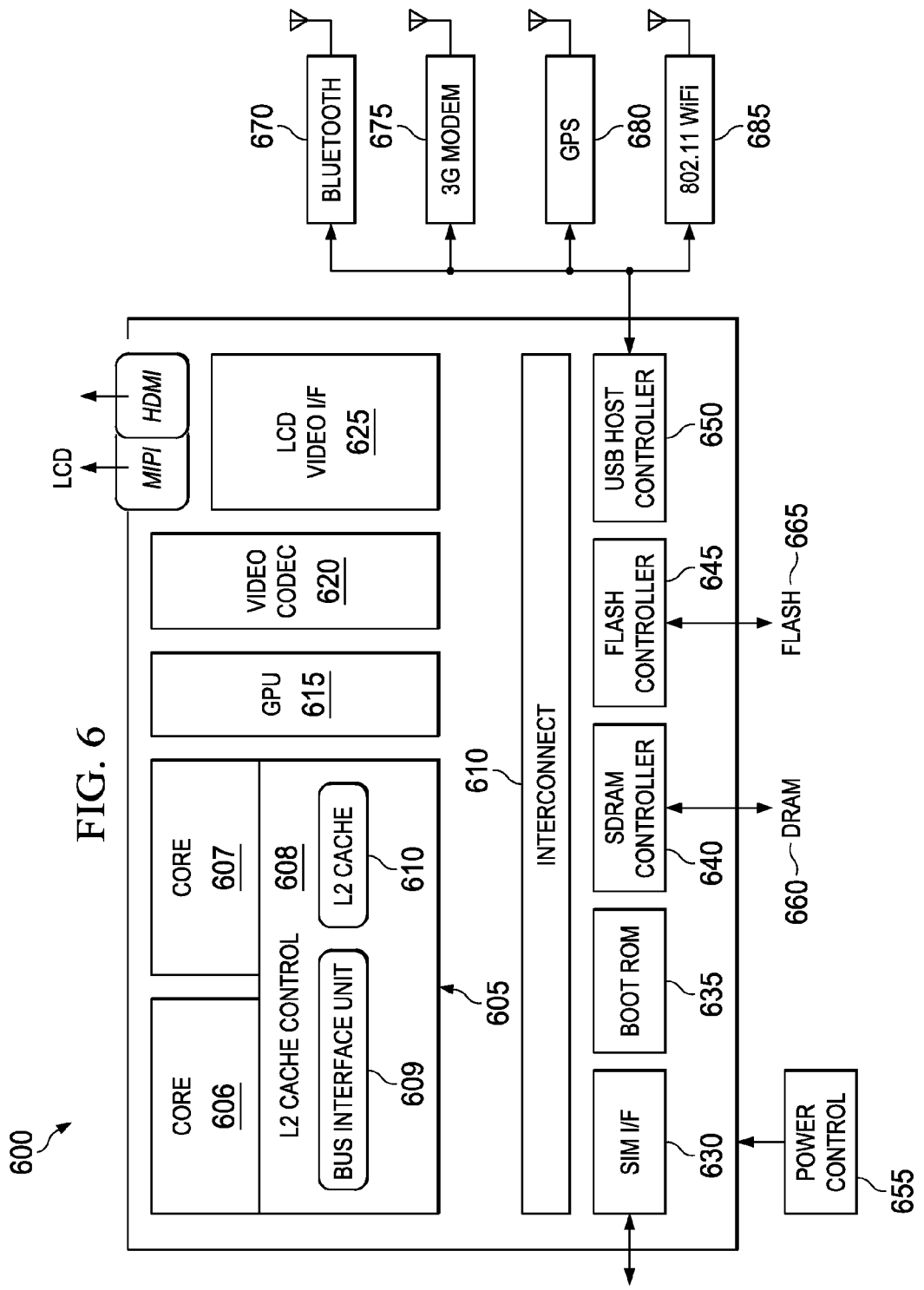
FIG. 6 is a simplified block diagram associated with an example ARM ecosystem system on chip (SOC) of the present disclosure.

FIG. 6 is a simplified block diagram associated with an example ARM ecosystem SOC 600 of the present disclosure. At least one example implementation of the present disclosure includes an integration of the power savings features discussed herein and an ARM component. For example, the example of FIG. 6 can be associated with any ARM core (e.g., A-9, A-15, etc.). Further, the architecture can be part of any type of tablet, smartphone (inclusive of Android™ phones, i-Phones™), i-Pad™, Google Nexus™, Microsoft Surface™, personal computer, server, video processing components, laptop computer (inclusive of any type of notebook), Ultrabook™, any type of touch-enabled input device, etc.

In this example of FIG. 6, ARM ecosystem SOC 600 may include multiple cores 606-607, an L2 cache control 608, a bus interface unit 609, an L2 cache 610, a graphics processing unit (GPU) 615, an interconnect 602, a video codec 620, and a liquid crystal display (LCD) I/F 625, which may be associated with mobile industry processor interface (MIPI)/high-definition multimedia interface (HDMI) links that couple to an LDC.

ARM ecosystem SOC 600 may also include a subscriber identity module (SIM) I/F 630, a boot read-only memory (ROM) 635, a synchronous dynamic random access memory (SDRAM) controller 640, a flash controller 645, a serial peripheral interface (SPI) master or USB host controller 650, a suitable power control 655, a dynamic RAM (DRAM) 660, and flash 665. In addition, one or more example embodiment include one or more communication capabilities, interfaces, and features such as instances of Bluetooth 670, a 3G modem 675, a global positioning system (GPS) 680, and an 802.11 WiFi 785.

In operation, the example of FIG. 6 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 7:
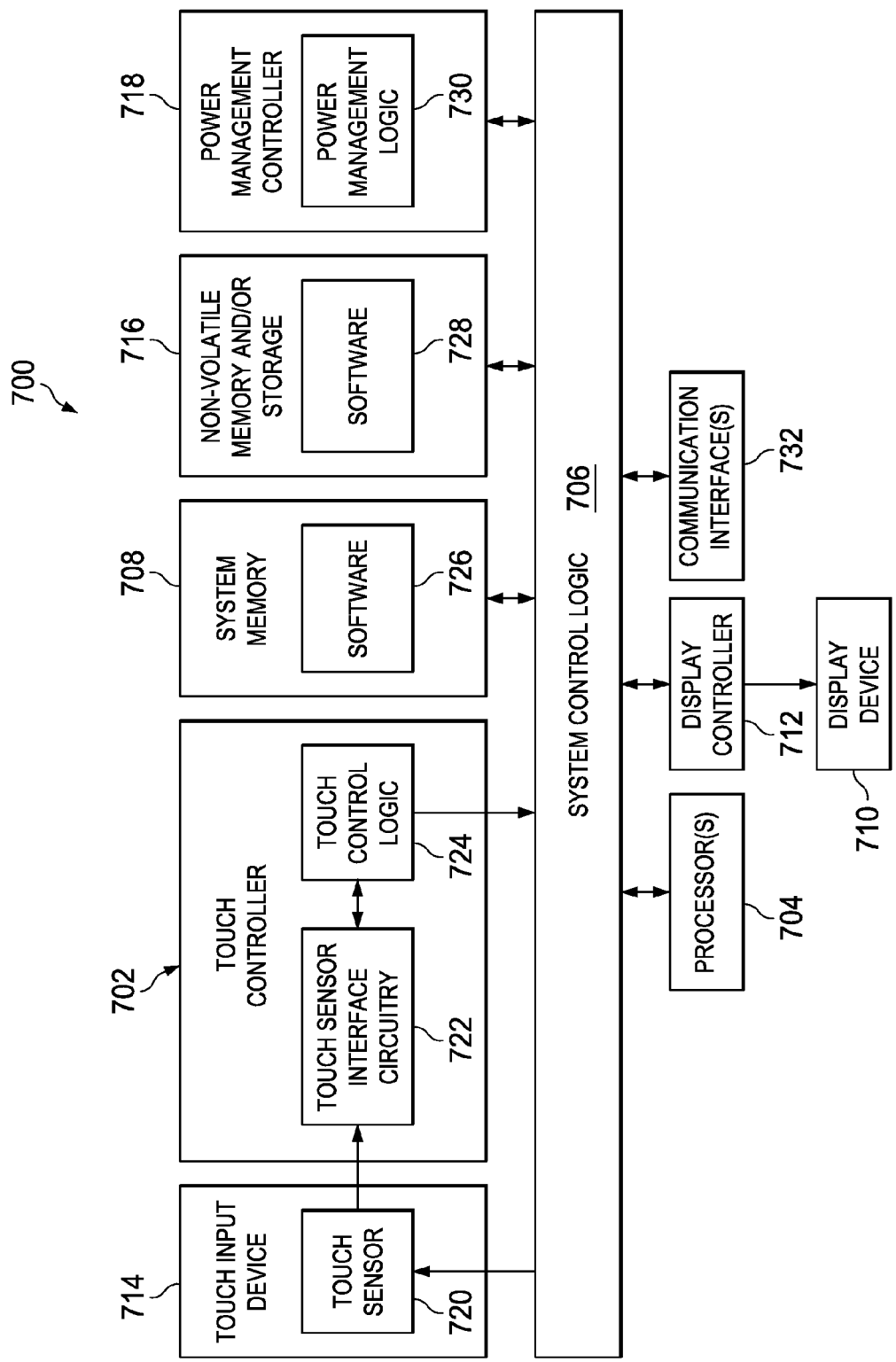
FIG. 7 is a simplified block diagram illustrating example logic that may be used to execute activities associated with the present disclosure.

FIG. 7 is a simplified block diagram illustrating potential electronics and logic that may be associated with any of the power saving operations discussed herein. In at least one example embodiment, system 700 includes a touch controller 702, one or more processors 704, system control logic 706 coupled to at least one of processor(s) 704, system memory 708 coupled to system control logic 706, non-volatile memory and/or storage device(s) 710 coupled to system control logic 706, display controller 712 coupled to system control logic 706, display controller 712 coupled to a display, power management controller 718 coupled to system control logic 706, and/or communication interfaces 716 coupled to system control logic 706.

System control logic 706, in at least one embodiment, includes any suitable interface controllers to provide for any suitable interface to at least one processor 704 and/or to any suitable device or component in communication with system control logic 706. System control logic 706, in at least one example embodiment, includes one or more memory controllers to provide an interface to system memory 708. System memory 708 may be used to load and store data and/or instructions, for example, for system 700. System memory 708, in at least one example embodiment, includes any suitable volatile memory, such as suitable dynamic random access memory (DRAM) for example. System control logic 706, in at least one example embodiment, includes one or more I/O controllers to provide an interface to a display device, touch controller 702, and non-volatile memory and/or storage device(s) 710.

Non-volatile memory and/or storage device(s) 710 may be used to store data and/or instructions, for example within software 728. Non-volatile memory and/or storage device(s) 710 may include any suitable non-volatile memory, such as flash memory for example, and/or may include any suitable non-volatile storage device(s), such as one or more hard disc drives (HDDs), one or more compact disc (CD) drives, and/or one or more digital versatile disc (DVD) drives for example.

Power management controller 718 may include power management logic 730 configured to control various power management and/or power saving functions disclosed herein or any part thereof. In at least one example embodiment, power management controller 718 is configured to reduce the power consumption of components or devices of system 700 that may either be operated at reduced power or turned off when the electronic device is in a closed configuration. For example, in at least one example embodiment, when the electronic device is in a closed configuration, power management controller 718 performs one or more of the following: power down the unused portion of the display and/or any backlight associated therewith; allow one or more of processor(s) 704 to go to a lower power state if less computing power is required in the closed configuration; and shutdown any devices and/or components, such as a keyboard, that are unused when an electronic device is in the closed configuration.

Communications interface(s) 720 may provide an interface for system 700 to communicate over one or more networks and/or with any other suitable device. Communications interface(s) 720 may include any suitable hardware and/or firmware. Communications interface(s) 720, in at least one example embodiment, may include, for example, a network adapter, a wireless network adapter, a telephone modem, and/or a wireless modem.

System control logic 706, in at least one example embodiment, includes one or more I/O controllers to provide an interface to any suitable input/output device(s) such as, for example, an audio device to help convert sound into corresponding digital signals and/or to help convert digital signals into corresponding sound, a camera, a camcorder, a printer, and/or a scanner.

For at least one example embodiment, at least one processor 704 may be packaged together with logic for one or more controllers of system control logic 706. In at least one example embodiment, at least one processor 704 may be packaged together with logic for one or more controllers of system control logic 706 to form a System in Package (SiP). In at least one example embodiment, at least one processor 704 may be integrated on the same die with logic for one or more controllers of system control logic 706. For at least one example embodiment, at least one processor 704 may be integrated on the same die with logic for one or more controllers of system control logic 706 to form a System on Chip (SoC).

For touch control, touch controller 702 may include touch sensor interface circuitry 722 and touch control logic 724. Touch sensor interface circuitry 722 may be coupled to detect touch input over a first touch surface layer and a second touch surface layer of a display (i.e., display device 710). Touch sensor interface circuitry 722 may include any suitable circuitry that may depend, for example, at least in part on the touch-sensitive technology used for a touch input device. Touch sensor interface circuitry 722, in one embodiment, may support any suitable multi-touch technology. Touch sensor interface circuitry 722, in at least one embodiment, includes any suitable circuitry to convert analog signals corresponding to a first touch surface layer and a second surface layer into any suitable digital touch input data. Suitable digital touch input data for one embodiment may include, for example, touch location or coordinate data.

Touch control logic 724 may be coupled to help control touch sensor interface circuitry 722 in any suitable manner to detect touch input over a first touch surface layer and a second touch surface layer. Touch control logic 724 for at least one example embodiment may also be coupled to output in any suitable manner digital touch input data corresponding to touch input detected by touch sensor interface circuitry 722. Touch control logic 724 may be implemented using any suitable logic, including any suitable hardware, firmware, and/or software logic (e.g., non-transitory tangible media), that may depend, for example, at least in part on the circuitry used for touch sensor interface circuitry 722. Touch control logic 724 for one embodiment may support any suitable multi-touch technology.

Touch control logic 724 may be coupled to output digital touch input data to system control logic 706 and/or at least one processor 704 for processing. At least one processor 704 for one embodiment may execute any suitable software to process digital touch input data output from touch control logic 724. Suitable software may include, for example, any suitable driver software and/or any suitable application software. As illustrated in FIG. 7, system memory 708 may store suitable software 726 and/or non-volatile memory and/or storage device(s).

Note that in some example implementations, the functions outlined herein may be implemented in conjunction with logic that is encoded in one or more tangible, non-transitory media (e.g., embedded logic provided in an application-specific integrated circuit (ASIC), in digital signal processor (DSP) instructions, software [potentially inclusive of object code and source code] to be executed by a processor, or other similar machine, etc.). In some of these instances, memory elements can store data used for the operations described herein. This includes the memory elements being able to store software, logic, code, or processor instructions that are executed to carry out the activities described herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP, an erasable programmable read only memory (EPROM), electrically erasable programmable read-only memory (EEPROM)) or an ASIC that includes digital logic, software, code, electronic instructions, or any suitable combination thereof.

Note that with the examples provided above, as well as numerous other examples provided herein, interaction may be described in terms of layers, protocols, interfaces, spaces, and environments more generally. However, this has been done for purposes of clarity and example only. In certain cases, it may be easier to describe one or more of the functionalities of a given set of flows by only referencing a limited number of components. It should be appreciated that the architectures discussed herein (and its teachings) are readily scalable and can accommodate a large number of components, as well as more complicated/sophisticated arrangements and configurations. Accordingly, the examples provided should not limit the scope or inhibit the broad teachings of the present disclosure, as potentially applied to a myriad of other architectures.

It is also important to note that the blocks in the flow diagrams illustrate only some of the possible signaling scenarios and patterns that may be executed by, or within, the circuits discussed herein. Some of these blocks may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the present disclosure in that any suitable arrangements, chronologies, configurations, and timing mechanisms may be provided without departing from the teachings provided herein.

It is also imperative to note that all of the Specifications, protocols, and relationships outlined herein (e.g., specific commands, timing intervals, supporting ancillary components, etc.) have only been offered for purposes of example and teaching only. Each of these data may be varied considerably without departing from the spirit of the present disclosure, or the scope of the appended claims. The specifications apply to many varying and non-limiting examples and, accordingly, they should be construed as such. In the foregoing description, example embodiments have been described. Various modifications and changes may be made to such embodiments without departing from the scope of the appended claims. The description and drawings are, accordingly, to be regarded in an illustrative rather than a restrictive sense.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

EXAMPLE EMBODIMENT IMPLEMENTATIONS

In at least one particular example implementation, an apparatus may include a means for determining that a first device maintains a link to a platform in a selective suspend state; means for assigning a first latency value to the first device; means for identifying at least one user detectable artifact when a second device exits the selective suspend state; and means for assigning, to the second device, a second latency value that is different from the first latency value. The 'means for' in these instances can include (but is not limited to) using any suitable processor, software, circuitry, hub, controller, interface, link, bus, communication pathway, etc.

The apparatus may also include means for determining that when a third device exits the selective suspend state, the exit causes a buffer overrun or a buffer underrun. The second latency value can be between approximately three (3) to five (5) milliseconds (ms). Additionally, the first latency value can be a Best Effort Service Latency (BESL) value indicative of an attempt to service the first device within a designated time interval. The first device can include a buffer and the latency value can be dependent on a size of the buffer.

What is claimed is:

1. An apparatus, comprising:
   logic, at least a portion of which is in hardware, the logic configured to:
   determine that a first device maintains a link to a platform in a selective suspend state;
   assign a first latency value to the first device;
   identify at least one user detectable artifact when a second device exits the selective suspend state; and
   assign, to the second device, a second latency value that is different from the first value.

2. The apparatus of claim 1, wherein the first latency value is approximately four hundred (400) microseconds (us).

3. The apparatus of claim 1, wherein the second latency value is between approximately three (3) to five (5) milliseconds (ms).

4. The apparatus of claim 1, wherein the first device is a digital camera, a secure digital card reader, or a television tuner.

5. The apparatus of claim 1, wherein the second device is a human interface device.

6. The apparatus of claim 1, wherein the apparatus is further configured to:
   determine that when a third device exits the selective suspend state, the exit causes a buffer overrun or a buffer underrun.

7. The apparatus of claim 1, wherein the first latency value is a Best Effort Service Latency (BESL) value indicative of an attempt to service the first device within a designated time interval.

8. The apparatus of claim 1, wherein the first device includes a buffer and the latency value is dependent on a size of the buffer.

9. A system, comprising:
   a device controller; and
   a platform power management controller, wherein the system is configured for:
   determining that a first device maintains a link in a selective suspend state;
   assigning a first latency value to the first device;
   identifying at least one user detectable artifact when a second device exits the selective suspend state; and
   assigning, to the second device, a second latency value that is different from the first latency value.

10. The system of claim 9, wherein the first latency value is approximately four hundred (400) microseconds (us).

11. The system of claim 9, wherein the second latency value is between approximately three (3) to five (5) milliseconds (ms).

12. The system of claim 9, wherein the first device is a digital camera, a secure digital card reader, or a television tuner.

13. The system of claim 9, wherein the second device is a human interface device.

14. The system of claim 9, wherein the system is further configured for:

determining that when a third device exits the selective suspend state, the exit causes a buffer overrun or a buffer underrun.

15. The system of claim 9, wherein the first latency value is a Best Effort Service Latency (BESL) value indicative of an attempt to service the first device within a designated time interval.

16. The system of claim 9, wherein the first device includes a buffer and the latency value is dependent on a size of the buffer.

17. A non-transitory computer readable medium comprising instructions that, when executed, cause an apparatus to:
    determine that a first device maintains a link to a platform in a selective suspend state;
    assign a first latency value to the first device;
    identify at least one user detectable artifact when a second device exits the selective suspend state; and
    assign, to the second device, a second latency value that is different from the first value.

18. The computer readable medium of claim 17, wherein the first latency value is approximately four hundred (400) microseconds (us).

19. The computer readable medium of claim 17, wherein the second latency value is between approximately three (3) to about five (5) milliseconds (ms).

20. The computer readable medium of claim 17, wherein the first device is a digital camera, a secure digital card reader, or a television tuner.

21. The computer readable medium of claim 17, wherein the second device is a human interface device.

22. The computer readable medium of claim 17, wherein the apparatus is further configured to:
    determine that when a third device exits the selective suspend state, the exit causes a buffer overrun or a buffer underrun.

23. The computer readable medium of claim 17, wherein the first latency value is a Best Effort Service Latency (BESL) value indicative of an attempt to service the first device within a designated time interval.

24. The computer readable medium of claim 17, wherein the first device includes a buffer and the latency value is dependent on a size of the buffer.

25. An apparatus, comprising:
    a circuit configured for:
    determining that a first device maintains a link to a platform in a selective suspend state;
    assigning a first latency value to the first device;
    identifying at least one user detectable artifact when a second device exits the selective suspend state; and
    assigning, to the second device, a second latency value that is different from the first latency value.

26. The apparatus of claim 25, wherein the circuit is further configured:
    for determining that when a third device exits the selective suspend state, the exit causes a buffer overrun or a buffer underrun.

27. The apparatus of claim 25, wherein the second latency value is between approximately three (3) to five (5) milliseconds (ms).

28. The apparatus of claim 25, wherein the first device is a digital camera, a secure digital card reader, or a television tuner.

29. The apparatus of claim 25, wherein the second device is a human interface device.

30. The apparatus of claim 25, wherein the first latency value is a Best Effort Service Latency (BESL) value indicative of an attempt to service the first device within a designated time interval, and wherein the first device includes a buffer and the latency value is dependent on a size of the buffer.

* * * * *